United States Patent [19]

Mackal et al.

[11] 4,216,182

[45] Aug. 5, 1980

[54] INFLATION MANIFOLD, METHOD OF AND APPARATUS FOR HEADING PLASTIC SAFETY PINS THEREIN

[76] Inventors: Glenn H. Mackal, Buena Vista Dr., Ringwood, N.J. 07456; Edward A. Judd, 253 Fulton St., New Milford, N.J. 07646

[21] Appl. No.: 764,598

[22] Filed: Feb. 1, 1977

Related U.S. Application Data

[63] Continuation of Ser. No. 558,244, Mar. 14, 1975, abandoned.

[51] Int. Cl.² ............................................. B29C 24/00
[52] U.S. Cl. ..................................... 264/71; 264/296; 264/DIG. 66
[58] Field of Search ....................... 264/23, 68, 71, 72, 264/296, 242, 320, 322, DIG. 66

[56] References Cited

U.S. PATENT DOCUMENTS

| | | | |
|---|---|---|---|
| 2,318,950 | 5/1943 | Larmour | 264/DIG. 66 |
| 2,366,274 | 1/1945 | Luth | 264/DIG. 66 |
| 2,510,693 | 6/1950 | Green | 264/DIG. 66 |
| 3,431,593 | 3/1969 | Miller | 264/23 X |
| 3,499,808 | 3/1970 | Obeda | 264/23 X |
| 3,721,726 | 3/1973 | Schwartzman | 264/296 X |

*Primary Examiner*—Thomas P. Pavelko

[57] ABSTRACT

A method of heading a thermoplastic safety pin in a manifold for use with an inflatable article such as a life vest, life raft, and the like. Before operation, a manifold has a capsule containing compressed gas mounted thereon, the manifold being actuated to inflate the inflatable article by pulling a lanyard attached to a lever which thrusts a capsule-piercing pin into the soft metal seal on the capsule. Before the operation of the manifold, the lever is held in locked-inoperative position by a frangible plastic pin which extends through a hole in the lever and aligned holes in the body of the manifold on both sides of a longitudinal slot therein which receives the lever when the latter is in inoperative position. When the operator swings the lever in order to advance the capsule-piercing pin to pierce the seal on the capsule, the plastic pin is broken. In accordance with the method of the invention, after the pin has been mounted in the manifold, the previously unheaded end of the pin is partially melted and compressed so as to flow laterally to form a head thereon. The die which engages the initially unheaded end of the pin is heated to a temperature which markedly exceeds the melting point of the plastic material of which the pin is made. In accordance with the method of the invention, such die is brought forcibly into contact with and is removed from engagement with the initially unheaded end of the pin several times a second, so as to avoid the complete melting of the pin and the sticking of the plastic material to the heated die.

8 Claims, 5 Drawing Figures

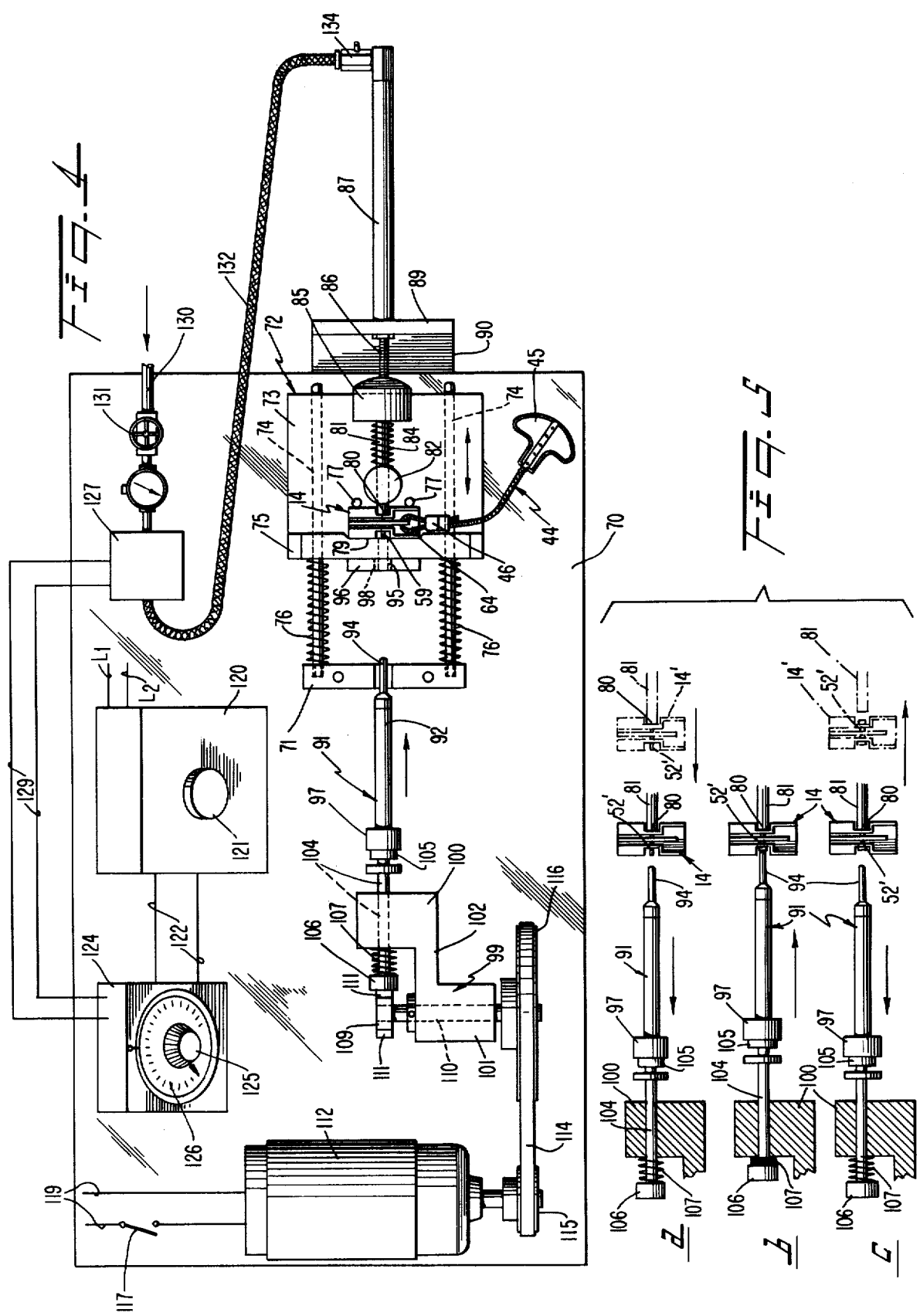

INFLATION MANIFOLD, METHOD OF AND APPARATUS FOR HEADING PLASTIC SAFETY PINS THEREIN

This is a continuation of application Ser. No. 558,244, filed Mar. 14, 1975 now abandoned.

This invention relates to a method of making certain parts of an inflation manifold assembly.

Although in its broader aspects the invention is not limited thereto, the invention is illustrated herein in connection with the use of the assembly in a $CO_2$ inflation manifold for use with an inflatable article such as a life vest, life raft, and the like. In the described assembly, the plastic flange or base, adapted for being heat-sealed to the wall of an inflatable article, has a central passage therethrough into which there extends the sleeve-like body of a check valve, such body being sealed to the mounting flange and locked against relative rotation with respect thereto. The combination of valve body and mounting flange is sealed to the sleeve portion of an inflation manifold in which the valve body is mounted. Such general combination of mounting flange, valve body, and inflation manifold is shown, for example, in Mackal U.S. Pat. No. 3,809,288, issued May 7, 1974. In such prior manifold, the $CO_2$ piercing needle is operated by a lever which is held in inoperative position by a fine gauge wire, such wire being broken by the deliberate swinging of the lever by the operator through medium of a lanyard secured thereto. The application of the wire to the manifold is time-consuming, and the presence of the wire detracts somewhat from the trim appearance of the manifold. Further, the wire extends beyond the outline of the manifold, and conceivably can be broken prematurely by becoming entangled with or abraded by some other member or body.

It is among the objects of the present invention to provide a method of heading the thermoplastic pin after it has been mounted in the manifold assembly by inserting it through the aligned holes in the body of the manifold and through the hole in the lever.

The above and further objects and novel features of the invention will more fully appear from the following description when the same is read in conjunction with the accompanying drawings. It is to be expressly understood, however, that the drawings are for the purpose of illustration only, and are not intended as a definition of the limits of the invention.

In the drawings, wherein like reference characters refer to like parts throughout the several views:

FIG. 4 is a somewhat schematic view in plan of the apparatus of the invention for heading the lever-locking pin of the manifold; and FIG. 5 is a composite schematic view illustrating successive portions of the operating cycle of the pin-heading apparatus of FIG. 4.

Figure 1:
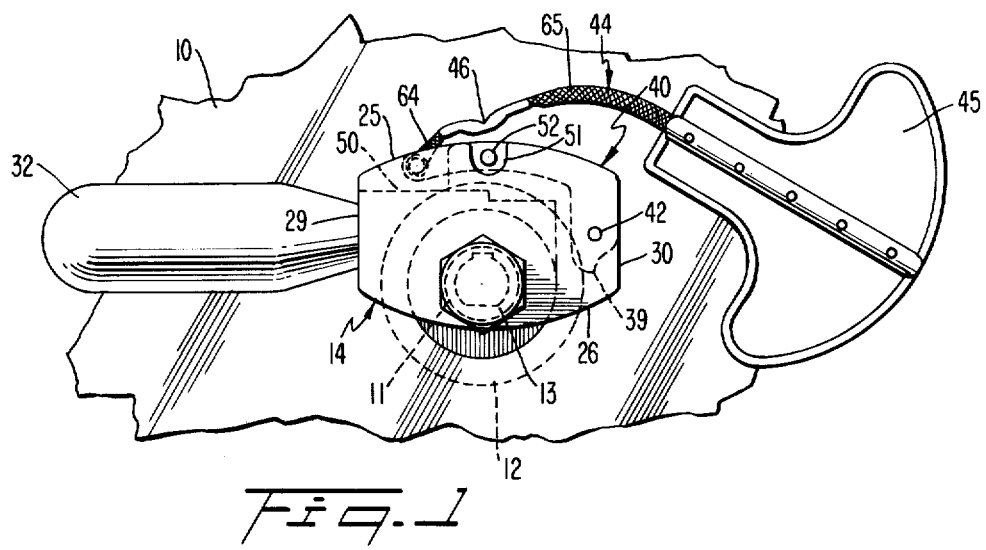
FIG. 1 is a view in elevation of a manifold according to the present invention, an inflatable body on which the manifold is mounted being shown fragmentarily.

In FIG. 1 there is shown a manifold and check valve assembly sealingly mounted upon a portion of a panel 10 of an inflatable article. The sleeve-like main body 11 of the check valve passes through and is sealed to a mounting flange 12 made of elastomeric material which is heat-sealable to the panel 10.

The illustrative inflation manifold is designated generally by the reference character 14. The manifold has a passage 13 extending therethrough transverse to the broad extent of the manifold, the passage having a flat side on the bottom thereof as it is shown in FIG. 1. The sleeve-like body 11 of the valve, which has an external configuration complementary to the cross-section of the passage, extends through such passage and is sealingly held therein by a cap nut screwed onto the threaded outer end of the body 11, there being suitable washers interposed, on the one hand, between a flange adjacent the inner end of the body 11 and the body of the manifold, and, on the other hand, between the cap nut and the body of the manifold on the other side thereof.

The embodiment of manifold shown in the drawings has a body 22 generally in the form of a thick disc having parallel front and rear sides 22, 24, respectively, parallel longitudinally spaced ends 29, 30 and upper and lower surfaces 25, 26, respectively (FIGS. 1 and 2), of oppositely convex, part-circular cylindrical shape. At its left-hand end as it is shown in the drawings, the body 22 of the manifold is provided with means for threadedly receiving the neck of a $CO_2$ cartridge 32 and sealing it to the gas-conducting chamber inwardly of the body 22 of the manifold. It is to be understood that the capsule 32 has a sealing disc of soft metal spanning its neck, such soft metal seal being adapted to be pierced when required, whereby to release the gas from the capsule so that it flows into the chamber through a passage and thence through an exit passage into the longitudinal bore in the valve body 11 through a radial passage therein communicating with the exit passage.

The soft metal seal of the capsule 32 is pierced, when it is desired to inflate the inflatable article, by means including a cam lever in the form of a bell crank lever 40 having an elongated lever arm which lies generally horizontal (FIGS. 1 and 2) when the lever is in retracted, inoperative position, and a generally vertical, shorter arm having a cam 39 on its lower end. The lever 40 is pivotally mounted upon a transverse pivot pin 42 which extends from one side of the manifold body to the other and spans a narrow, longitudinally extending lever-receiving slot 49 which extends longitudinally of the body 22 at the top thereof and downwardly along the right-hand end of the manifold body.

Reciprocably and sealingly mounted in a circular cylindrical bore in body 22 which forms a prolongation of the chamber therein, there is a needle plunger the enlarged outer end or head of which is in the form of a cam follower. The plunger is constantly urged to the right into engagement with the cam 39 by a coil compression spring (not shown) which acts between the head of the plunger and an annular shoulder at the left-hand end of the chamber. Coaxial of the plunger and forming a part thereof is a capsule seal-piercing needle, the sharpened left-hand end of which is spaced from the seal at the end of the neck of the capsule 32 when the lever 40 is in its retracted, inoperative position, as shown in FIGS. 1 and 2, in which it lies wholly within a longitudinally extending laterally centrally disposed slot 49.

When it is desired to release the gas from the capsule 32 in order to inflate the inflatable article, the lever 40 is swung clockwise about its mounting pivot shaft 42 until the high point of the cam 39 has passed through the position in which it engages the high point of the cam follower on the end of the head of the needle plunger. This causes the piercing needle first to be thrust to the left against the opposition of the spring sufficiently to pierce the seal in the neck of the capsule 32, the spring thereafter thrusting the plunger to the right as the high point of its cam follower end travels downwardly on the cam 39 on lever 40, thereby to open the hole made in the soft metal seal in the neck of the capsule 32 by the needle. Such swinging of the lever 40 is accomplished by pulling a handle 45 on a lanyard cord 44, which is secured to the outer end of the longer arm of the lever 40, by a crimped sleeve-like means 46 in the direction to the right in FIG. 1. The lanyard cord is passed through a hole in the outer end of lever 40, and is folded on itself to form a bight 64, the means 46 being crimped on the two parallel runs 65 of the cord 44.

Figure 2:
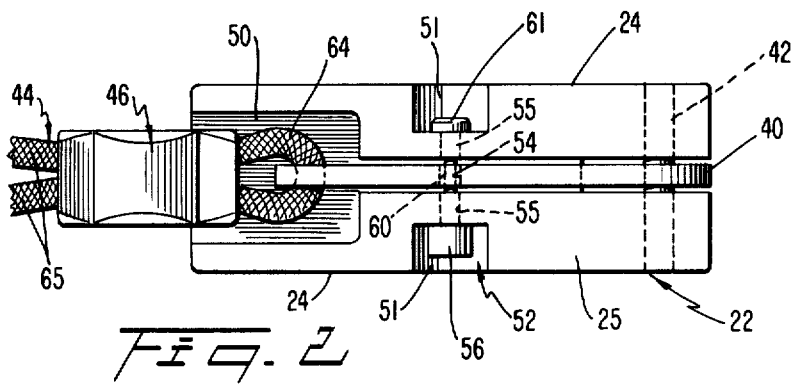
FIG. 2 is a view in plan of the inflation manifold of FIG. 1.

The lever 40 is secured in the position of FIGS. 1 and 2 by a headed frangible plastic pin 52 which extends through a hole 54 in lever 40 and aligned passages 55 in body 22 extending inwardly from oppositely disposed aligned recesses 51 therein. Such pin 52 prevents the unwanted movement of the lever 40 in a seal-piercing direction, but may readily be broken by a deliberate, fairly strong pull exerted upon the handle 45 of the lanyard. As shown in FIG. 2, the body 22 of the manifold is also provided at its upper left-hand corner (FIGS. 1 and 2) with a broader recess 50 into which the outer free end of the lever 40 protrudes, recess 50 receiving the inner end of the cord fastener 46, thereby allowing such fastener to overlie the portion of the body of the capsule 32 adjacent its neck so that it, the lanyard cord, and the handle 45 are generally out of the way until needed.

Figure 3:
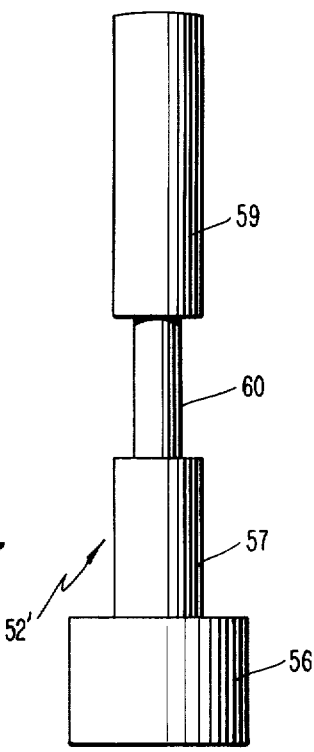
FIG. 3 is a view in elevation on an enlarged scale of an unheaded plastic pin employed making the manifold assembly of the invention.

The plastic pin 52 as initially formed, is shown in FIG. 3, where it is designated 52'. Pin 52' has a first head 56 which is molded integrally therewith, and has a shank having portions 57 and 59 of equal diameter positioned to be received, respectively, within the portions of the pin-receiving hole in body 22 which lie closer to and further from the head 56 of the pin. Between the shank portions 57 and 59 there is a portion 60 of markedly smaller diameter, portion 60 being disposed spaced from the head 56 a distance so that when the pin is assembled in the manifold as shown, the portion 60 lies within the hole 54 in the lever 40. The axial length of the head 56 on the pin is somewhat less than the depth of the recess 51 in the body 22 of the manifold, and the shank or stem portion 59 of the pin is of such length as to form, when headed, a second head 61 (FIG. 2) on the pin, head 61 being of such axial length that it lies well within its respective recess 51. As a result, all parts of the pin 52 lie well within the outline of the manifold defined by its bounding surfaces.

An illustrative embodiment of apparatus for carrying out the method of the invention is shown in FIGS. 4 and 5. As there shown, the components of the apparatus are mounted upon and secured to a base plate 70. A first vertical plate member 71 is secured to the plate member 70 intermediate the length of the latter, plate 71 having its length disposed transverse to the length of plate 70. A carriage 72 having a base plate 73 is mounted upon plate 70 through the medium of plate 71, the carriage being reciprocal longitudinally of the plate 70, as designated by the double-headed arrow. Carriage 72 is supported upon and guided by two spaced parallel guide rods 74, the left-hand ends of which are affixed to the plate 71; the right-hand end portions of rods 74 run through suitable guides affixed to the carriage, including guide bushings affixed to a second upright plate 75 which forms the left-hand end of the carriage as it is shown in FIG. 4.

Carriage 72 is constantly urged to the right by coil compression spring 76 telescoped over the respective guide rod 74 and acting between the plate 71 and the plate 75, as shown. A laterally centrally located manifold-receiving pocket is provided on the carriage 72, such pocket being defined by a laterally central recess 79 in the right-hand face of plate 75, and two upstanding rods 77 which are secured to the base plate 73 of the carriage to the right of recess 79 (FIG. 4). The lateral length of the recess 79 is such as accurately to receive the left-hand side portion of a manifold 14 which is placed therein as shown in FIG. 4, the rods 77 being spaced from the broad surface of the recess 79 a distance slightly exceeding the width of the manifold 14. The manifold is thus accurately held on the carriage when the pin-heading operation is performed by the apparatus.

Also supported on the base plate 73 of the carriage 72 is an upstanding rod or post 82 having a horizontal bore therethrough which is coaxial of the unheaded pin 52' which has been inserted in the manifold prior to the mounting of the manifold in the manifold-receiving pocket on the carriage. Reciprocably mounted in a horizontal passage in the post 82 is a rod 81 having a left-hand end 80 which selectively engages the preformed head 56 on the pin 52' and backs up the pin while the other end of the pin is headed. The die rod 81 has an enlarged head 85 on the right-hand end thereof. The die rod 81 is constantly urged toward its retracted position, shown in FIG. 4, wherein the backup die end 80 of such rod lies just to the right of the right-hand space of the manifold 14 mounted in the pocket on the carriage by a coil compression spring 81 which acts between the right-hand surface of the post 82 and the left-hand end surface of the enlargement 85 on the die rod. The coil compression spring 84 has a compressive resistance which is markedly less than that exerted by the two coil compression springs 76 acting together. The reason for this will become apparent hereafter.

During the operation of heading the pin 52' the enlarged head 85 of the die rod 81 and thus the die 80 are first thrust to the left to compress spring 81 until the die 80 engages the head 56 of the pin; continued thrusting of the head 85 to the left carries with it the carriage 72 and the manifold mounted therein. Such travel of the carriage compresses the springs 76. Travel of the carriage 72 to the left continues until the left-hand end of the die plate 96 mounted upon the left side of the plate 75 forming a part of the carriage 72 lies in proximity to the right-hand vertical face of the fixed plate 71. As will be more readily apparent hereinafter, such travel of the carriage and the manifold mounted therein to the left is caused by the extension of a piston rod 86 attached to a piston within an air cylinder 87, both the piston rod and the air cylinder being disposed to the right of and coaxial of the die rod 81. Specifically, the air cylinder 87 is mounted at its left-hand end upon the upstanding leg portion 89 of an L-shaped bracket, the horizontal lower portion of which is fixedly secured to the right-hand edge portion of the base plate 90 of the apparatus.

An electrically heated die 91, which may be in the nature of an electric soldering iron powered by a source (not shown) through flexible cable 97, has a central cylindrical body 92 and a coaxially disposed tip 94 of smaller diameter. The member 91 is disposed coaxial of the die rod 81 and the air cylinder 87. The above-mentioned guide plate 96 has a passage 95 therethrough of a diameter such as accurately to receive the tip 94 of the element 91, there being a plurality of radially inwardly disposed thin members 98 radially arranged around the passage 95 in order to minimize the loss of heat from the heated tip 94 through the guide member 96 when the tip 94 lies within the passage 95 and the coaxially arranged passage extending through the plate 75.

The heated die element 92, 94 is constantly reciprocated along its longitudinal axis. Mounted upon the base plate 70 of the apparatus adjacent the lower left-hand corner thereof, as is shown in FIG. 4, there is an upstanding frame part 99 having a right-hand end laterally extending portion, a left-hand portion 101 extending laterally in the opposite direction from portion 100, and an intermediate web portion 102. A plunger rod 104 is disposed for reciprocation in a horizontal bore in part 100, the plunger 104 having a heat-insulating means 105 by which it is connected to the rear or left-hand end of the heated element 91. The left-hand end of the plunger rod 102 has an enlarged head 106 thereon functioning as a cam follower, the plunger rod 104 being constantly urged to the left by a coil compression spring 107 which acts between the head 106 and the left-hand vertical surface of the part 100 of the frame member 99. A two-lobed cam 109 is fixedly mounted upon the inboard end of a cam shaft 110, the lobes 111 on the cam 109 being spaced 180° from each other and lying in alignment with the cam follower head 106 of the plunger 104. The cam shaft and cam are driven by an electric motor 112 through the medium of a "timing" belt 114 entrained over a first, smaller motor pulley 115 and a second, larger pulley 116 affixed to the outboard end of the cam shaft 110. The motor 112 is powered by a current source, not shown, the leads from which are designated 119; in one of the leads there is interposed a selectively operated switch 117.

Further mechanism for controlling the apparatus is provided as follows: A suitable source of electric power $L_1$, $L_2$ is connected to a switch 120 which has an operating button 121. Upon depressing the button 121, the lead wires 122 therefrom, which lead to a timer 124, are energized, thereby to accept the timer in operation. The timer has a graduated scale 125 and a knob having a pointer 126 cooperating therewith, the timer being able to be preset for a predetermined period, and when energized automatically returning to the beginning of a succeeding predetermined time period of the same length period.

When the lead wires 122 are energized, the timer 124 starts its cycle, and switches on current to wires 129 which lead to an electromagnetic switch 127. Switch 127 is normally closed, but when energized opens to allow the ingress of compressed air through an inlet conduit 130, a normally open shut-off and throttling valve 131, to a flexible conduit 132 which leads to an inlet fitting 134 at the rear or right-hand end of the air cylinder 87.

The manner of operation of the apparatus of FIG. 4 will become more readily apparent upon a consideration of the parts a, b and c in FIG. 5. In part a of FIG. 5 a manifold, there designated 14', having an unheaded pin 52' inserted therein, has been placed in the manifold-receiving pocket on the carriage 72, has been engaged by the back-up die 80 on the die plunger 81, and is being moved to the left with the carriage 72 on which it is mounted, by the piston rod 86 of the air cylinder 87. Such preliminary position of the manifold 14' is shown in phantom lines at the right in part a of FIG. 5. After a predetermined length of travel to the left, the carriage 72 and the manifold 14' thereon are stopped in a predetermined position, wherein the manifold, now designated 14, is shown in full lines in part a of FIG. 5. In such position, the preformed head 56 of the pin 52' continues to be engaged and backed up by the die forming head 80 of the die plunger 81.

Meanwhile, the motor 112 has been energized by closing switch 117, and remains constantly in rotation, thereby constantly to reciprocate the heated element 92 and the heated forward end 94 thereof. In the left-hand portion of parts a of FIG. 5 the element 91 is shown as having reached the left-hand terminus of its reciprocating travel. In part b of FIG. 5, the heated element 94 is shown as having been advanced to the right so that the forward end or tip of the heated die 94 has engaged the previously unheaded part 59 of the pin 52'. Upon the first engagement between the heated die element 94 and the previously unheaded part 59 of the pin, part 59 is heated sufficiently to become plastic and to be partially deformed and thrust to the right so as to begin the heading operation.

In such initial contact between the die 94 and the portion 59 of the pin, the carriage 72, the manifold 14, and the pin 52' carried by the latter are thrust slightly to the right against the opposition afforded by the piston rod 86. Following such initial contact between the die 94 and the portion 59 of the pin 52', the die 94 is retracted to the left so as to pull free of the now partially deformed portion 59 of the pin, permitting it to cool momentarily. Immediately thereafter, the portion 59 of the pin is again engaged by the heated die 94. Such operation, that is, the engagement between the portion 59 of the pin and the heated die 94, followed by the withdrawing of the heated die 94 from engagement with the pin portion 59 follows until the portion 59 of the pin has been fully deformed to form a second head on the pin, such operation being terminated when the preset timer 124 has reached its zero point. In part c of FIG. 5 the heated element 91 and the die tip 94 are shown being retracted, that is, at a time when the cam follower 106 lies between the two cam lobes 111.

After the pin-heading operation has been completed, the timer 124, now having reached zero of its prdetermined time interval, opens the switch 120 and closes the electromagnetic valve 127. Thereupon the coil compression springs 76 thrust the carriage 72 to the right, exhausting air from the right-hand pin of the air cylinder 87. At the end of the travel of the carriage 72 to the right, coil compression spring 81 acts to thrust the rod 84 to the right, still further retracting the piston rod 86, and pulling the back-up die 80 from the cavity within the right-hand side of manifold 14, thereby permitting the manifold with its now headed pin 52 to be removed from the pocket on the carriage by purely vertical movement therefrom. In the portion of part c of FIG. 5 the manifold 14 is shown being retracted to the right with the carriage 72 (not shown) preparatory to the retraction of the back-up die plunger 81.

In accordance with the preferred but non-limiting embodiment of the method of the invention, the pin 52 is made of an acetal resin such as "Delrin", the melting point of which is about 300–400 degrees F. The pin heading die is heated to a temperature at least 100° F. above the melting of the pin 52. Preferably, the pin heading die 94 is heated to a temperature between 500° and 1000° F. The frequency of reciprocation of the heated die 94, that is, the frequency with which it engages the end of the pin being headed and is pulled free therefrom can vary widely. Such frequency of oscillation, may be, for instance, from three or four times per second up to as much as 20 or more times per second. All of the above parameters can, of course, vary depending upon the nature of the material from which the pin is made, the size of the pin, and the maximum time in which the heated die can safely be left in contact with the end of the pin being headed, at each such engagement therebetween, without causing sticking between the die and the pin. In one manner of carrying out the instant invention, that is, the heading of "Delrin" pins in a manifold as above-described, the frequency of reciprocation of the heated die lies between three to four per second. The optimum parameters result in the production of a satisfactory head on the pin, without the sticking of the die to the pin, in the shortest possible time.

It has been found that employment of the method and apparatus of the invention results in a 50–80 percent saving in labor time, that is, the assembly of the pin in the manifold and its heading takes but 20–50 percent of the time which was formerly necessary to thread the copper wire through the body of the manifold and the operating lever, to tie a square knot in such wire, and to sever the wire from the wire supplied.

It is to be understood in the above description of the apparatus of the invention and its manner of functioning that the back-up die 80 comes to a stop in its travel to the left when the coil compression spring 84 is squeezed tight between post 82 and member 85. It is also to be understood that reciprocable fluid motor 87 is subjected to fluid under such pressure that piston rod 86 is yieldable, that is, the pin being headed and the back-up die 80 can move to the right when necessary as heading die 92 approaches and reaches its position of maximum extension to the right.

Although the invention is illustrated and described with reference to a single preferred embodiment thereof, it is to be expressly understood that it is in no way limited to the disclosure of such a preferred embodiment, but is capable of numerous modifications within the scope of the appended claims.

What is claimed is:

1. A method of forming by a heated die a head on an end of a pin made of a thermoplastic acetal resin, comprising heating the die to a temperature substantially above the melting point of the pin, reciprocating the die toward and away from the end of the pin to be headed so as repeatedly briefly compressively to engage the pin and progressively to deform it to form a head thereon, and after each such engagement between the die and the pin removing the die from engagement with the pin before sticking occurs between them, the partially deformed portion of the pin cooling momentarily when the die is removed from engagement therewith.

2. A method according to claim 1, wherein the heated die reciprocates alternately to engage the pin being headed and to withdraw from engagement therewith with a frequency of from 3 to 20 times a second.

3. A method according to claim 2, wherein the pin heading die is heated to a temperature at least 100° F. above the melting point of the pin.

4. A method according to claim 3, wherein the pin has a melting point of about 300°–400° F., and the pin heading die is heated to a temperature between 500° and 1000° F.

5. A method of heading a thermoplastic pin inserted in a passage in a body, comprising supporting the body with the pin inserted therein with a first, unheaded end of the pin protruding from a first side of the body, heating a pin heading die above the melting point of the pin, mounting the die axially of the pin and confronting the first end of the pin, and reciprocating the heading die in the body and the pin inserted therein relatively toward and away from each other at a frequency of from 3 to 20 times a second so that the die alternately engages the first end of the pin and is withdrawn from engagement therewith, whereby the first end of the pin is repeatedly partially melted and compressed so that a head is progressively formed on said first end of the pin, the partially deformed portion of the pin cooling momentarily when the die is withdrawn from engagement therewith.

6. A method according to claim 5, wherein the means for supporting the body is a carriage having a body supporting means thereon, and comprising continuously reciprocating the die between the retracted position and an extended position, and thrusting the carriage toward the die so that the first end of the pin is engaged by the die when the latter is in its extended position but is out of engagement with the die when the latter is in its retracted position.

7. A method according to claim 6, wherein the thrusting of the carriage toward the die is yieldable, and comprising stopping the carriage in an advanced terminal position nearest the heading die.

8. A method according to claim 5, wherein the thermoplastic material is an acetal resin, and the withdrawing of the die from engagement with the pin takes place before the plastic material sticks to the die.

* * * * *